United States Patent
Moriyasu et al.

(10) Patent No.: US 11,154,897 B2
(45) Date of Patent: Oct. 26, 2021

(54) PUSH-OUT APPARATUS

(71) Applicant: KAWASAKI JUKOGYO KABUSHIKI KAISHA, Kobe (JP)

(72) Inventors: Kotaro Moriyasu, Kakogawa (JP); Kazuki Matsumoto, Kakogawa (JP); Norifumi Yoshimoto, Osaka (JP); Mitsuru Ikuta, Kakogawa (JP); Koji Oda, Kakogawa (JP); Hirokadu Hata, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/481,931

(22) PCT Filed: Feb. 1, 2017

(86) PCT No.: PCT/JP2017/003625
§ 371 (c)(1),
(2) Date: Jul. 30, 2019

(87) PCT Pub. No.: WO2018/142511
PCT Pub. Date: Aug. 9, 2018

(65) Prior Publication Data
US 2020/0246826 A1 Aug. 6, 2020

(51) Int. Cl.
*B05C 17/005* (2006.01)
*B05C 5/02* (2006.01)
(Continued)

(52) U.S. Cl.
CPC ............ *B05C 5/02* (2013.01); *B05C 11/1013* (2013.01); *B05C 17/00576* (2013.01); *B05C 17/01* (2013.01)

(58) Field of Classification Search
CPC .............. B05C 17/00579; B05C 17/01; B05C 17/00576; B05C 17/00553;
(Continued)

(56) References Cited

U.S. PATENT DOCUMENTS 4,714,423 A * 12/1987 Hattori .................... B30B 11/26
425/376.1
5,626,887 A * 5/1997 Chou .................... B29C 45/586
425/129.1

(Continued)

FOREIGN PATENT DOCUMENTS

JP     H3-189376 A    8/1991
JP     2003-290694 A   10/2003

*Primary Examiner* — Charles P. Cheyney
(74) *Attorney, Agent, or Firm* — Sughrue Mion, PLLC

(57) ABSTRACT

A piston includes: a base body; a sealing ring provided at an outer peripheral surface of the base body and configured to slidingly contact an inner peripheral surface of a container; a pressing body provided at one side of the base body in a non-hermetical state with respect to the container, the one side being close to a fluid; and a supporting member supporting the pressing body in a state where the pressing body is separated from the base body. The base body includes an air discharge hole through which an inside and outside of the container communicate with each other, the inside and outside of the container being sealed by the sealing ring. The pressing body can approach and separate from the base body between a first position at which the pressing body opens the air discharge hole and a second position at which the pressing body closes the air discharge hole. The pressing body is supported by the supporting member at the first position and moves to the second position by force applied from the fluid in the container.

8 Claims, 3 Drawing Sheets

(51) Int. Cl.
*B05C 11/10* (2006.01)
*B05C 17/01* (2006.01)

(58) Field of Classification Search
CPC . B05C 17/00559; B05C 17/0103; B05C 5/02; B05C 11/1013
USPC .......................................... 222/326, 333, 63
See application file for complete search history.

(56) References Cited

U.S. PATENT DOCUMENTS

| | | | | |
|---|---|---|---|---|
| 7,793,802 B2* | 9/2010 | Knox | ................... | B67D 7/0227 |
| | | | | 222/183 |
| 7,946,454 B2* | 5/2011 | Scardino | ............... | G01F 11/023 |
| | | | | 222/146.6 |
| 8,453,887 B2* | 6/2013 | Boehm | ................... | A61C 5/62 |
| | | | | 222/387 |
| 9,174,007 B2* | 11/2015 | Lum | ................ | A61B 5/150244 |
| 9,469,061 B2* | 10/2016 | Frey | ................... | B65D 83/0005 |
| 9,862,001 B2* | 1/2018 | Turner | ................... | H02P 7/285 |
| 2005/0066809 A1 | 3/2005 | Nehren et al. | | |

* cited by examiner

PUSH-OUT APPARATUS

CROSS REFERENCE TO RELATED APPLICATIONS

This application is a National Stage of International Application No. PCT/JP2017/003625 filed Feb. 1, 2017.

TECHNICAL FIELD

The present invention relates to a push-out apparatus configured to eject a non-Newtonian fluid from an ejection port of a container in which the fluid is stored.

BACKGROUND ART

Generally, when ejecting a highly viscous fluid, such as an adhesive, to a workpiece, a cartridge container in which the fluid is stored is attached to an ejecting jig, and a piston is inserted into the container through a back surface opening of the container and is advanced. With this, the fluid in the container is ejected from an ejection port (see PTL 1, for example).

CITATION LIST

Patent Literature

PTL 1: Japanese Laid-Open Patent Application Publication No. 2003-290694

SUMMARY OF INVENTION

Technical Problem

When inserting the piston into the container through the back surface opening of the container, air is entrained between the piston and the fluid in the container. If the air exists between the fluid in the container and the piston, air bubbles are mixed in the fluid when pressing the piston. Especially when the air bubbles are mixed in a highly viscous fluid, the air bubbles hardly get out from the inside of the fluid and stay inside the fluid, which is not preferable. However, in order to push out the highly viscous fluid by the piston to eject the fluid from the ejection port of the container, high pressure needs to be applied to the fluid, and it is currently difficult to discharge the air in the container from a portion other than the ejection port.

An object of the present invention is to provide an apparatus capable of appropriately eject a non-Newtonian fluid from a container by a piston while discharging, to an outside, air existing between the fluid in the container and the piston.

Solution to Problem

A push-out apparatus according to one aspect of the present invention is a push-out apparatus configured to eject a non-Newtonian fluid from an ejection port of a container in which the fluid is stored. The push-out apparatus includes a piston configured to advance toward and retreat from the fluid in the container through an opening of the container. The piston includes: a base body; a sealing ring provided at an outer peripheral surface of the base body and configured to slidingly contact an inner peripheral surface of the container; a pressing body provided at one side of the base body in a non-hermetical state with respect to the container and configured to press the fluid in the container, the one side being close to the fluid; and a supporting member supporting the pressing body in a state where the pressing body is separated from the base body. The base body includes an air discharge hole through which an inside and outside of the container communicate with each other, the inside and outside of the container being sealed by the sealing ring. The pressing body approaches and separates from the base body between a first position at which the pressing body opens the air discharge hole and a second position at which the pressing body closes the air discharge hole. The pressing body is supported by the supporting member at the first position and moves to the second position by force applied from the fluid in the container.

According to the above-described configuration, in a case where the pressing body arranged non-hermetically with respect to the container is located at the first position, air existing between the fluid in the container and the piston can be discharged to the outside of the container through the air discharge hole of the base body even when the sealing ring provided at the base body is in slide contact with the inner peripheral surface of the container. Then, after the air is discharged, the pressing body receives the force from the fluid in the container, and with this, the pressing body moves to the second position to close the air discharge hole. Therefore, the fluid can be ejected from the ejection port of the container while preventing the fluid from flowing backward through the air discharge hole.

The push-out apparatus may be configured such that: the piston is configured to advance and retreat in an upper-lower direction; the pressing body is arranged under the base body; the base body includes a guide hole extending in the upper-lower direction; the supporting member includes a shaft portion extending through the guide hole and fixed to the pressing body and a stopper portion provided at an upper portion of the shaft portion and configured to contact an upper surface of the base body so as to be separable from the upper surface of the base body; and in a state where a gap is formed between the pressing body and the base body, the stopper portion contacts the upper surface of the base body, and with this, the pressing body is supported by the supporting member at the first position.

According to the above configuration, by the own weights of the pressing body and the supporting member, the stopper portion contacts the upper surface of the base body, and the pressing body is supported at the first position. On the other hand, when the force from the fluid in the container acts on the pressing body, the shaft portion moves upward relative to the guide hole, and the stopper portion separates upward from the base body. Thus, the pressing body moves to the second position. Therefore, the pressing body can be supported and allowed to move by such simple configuration. It should be noted that the "upper-lower direction" is only required to be a direction including a vertical component such that the pressing body and the supporting member can move downward relative to the base body by their own weights, and the "upper-lower direction" does not have to be a completely vertical direction.

The push-out apparatus may be configured such that: the piston further includes a sealing member provided at one of the base body and the pressing body so as to be opposed to the other of the base body and the pressing body; when the pressing body is located at the first position, the sealing member separates from the other of the base body and the pressing body to open the air discharge hole; and when the pressing body is located at the second position, the sealing member contacts the other of the base body and the pressing body to close the air discharge hole.

According to the above configuration, the fluid can be surely prevented from flowing into the air discharge hole while the fluid is being ejected, and the base body can be easily washed.

The push-out apparatus may be configured such that an outer diameter of the pressing body is smaller than an outer diameter of the sealing ring.

According to the above configuration, the air between the fluid in the container and the pressing body can be discharged from the air discharge hole through the gap between an outer peripheral surface of the pressing body and the inner peripheral surface of the container. Further, since the gap is generated between the pressing body and the container, the pressing body can be prevented from approaching and moving toward the base body by frictional resistance from the inner peripheral surface of the container before the pressing body in the container reaches the fluid.

The push-out apparatus may be configured such that the piston is configured such that before the fluid reaches a surface of the pressing body which surface is located close to the base body, force applied to the pressing body from the fluid exceeds force by which the pressing body is kept at the first position.

According to the above configuration, before the fluid reaches a surface of the pressing body which surface is located close to the base body, the force applied to the pressing body from the fluid exceeds the force by which the pressing body is kept at the first position, and therefore, the pressing body moves to the second position. On this account, the fluid is prevented from flowing into the air discharge hole when the piston starts pressing the fluid.

The push-out apparatus may further include a clamp configured to fix the container in an advancing-retreating direction of the piston. The clamp may allow the container to move within at least a predetermined movement range in a direction perpendicular to the advancing-retreating direction.

According to the above configuration, when the sealing ring of the piston slides on the inner peripheral surface of the container, the container is prevented from moving in the advancing-retreating direction of the piston, and the positional displacement between the container and the piston in the direction perpendicular to the piston advancing-retreating direction can be self-corrected by the movement of the container.

The pressing apparatus may further include: an actuator configured to operate the piston; and a controller configured to control the actuator, wherein the controller includes: a torque detecting unit configured to detect torque transmitted from the actuator to the piston; and a control unit configured to reduce driving force of the actuator when the torque detected by the torque detecting unit exceeds a predetermined upper limit.

According to the above configuration, it is possible to prevent a case where the pressure of the non-Newtonian fluid ejected from the ejection port of the container becomes excessive, and therefore, the load applied to the apparatus becomes excessive.

Advantageous Effects of Invention

According to the present invention, the non-Newtonian fluid can be appropriately ejected from the container by the piston while discharging, to an outside, air existing between the fluid in the container and the piston.

DESCRIPTION OF EMBODIMENTS

Hereinafter, an embodiment will be described with reference to the drawings.

Figure 1:
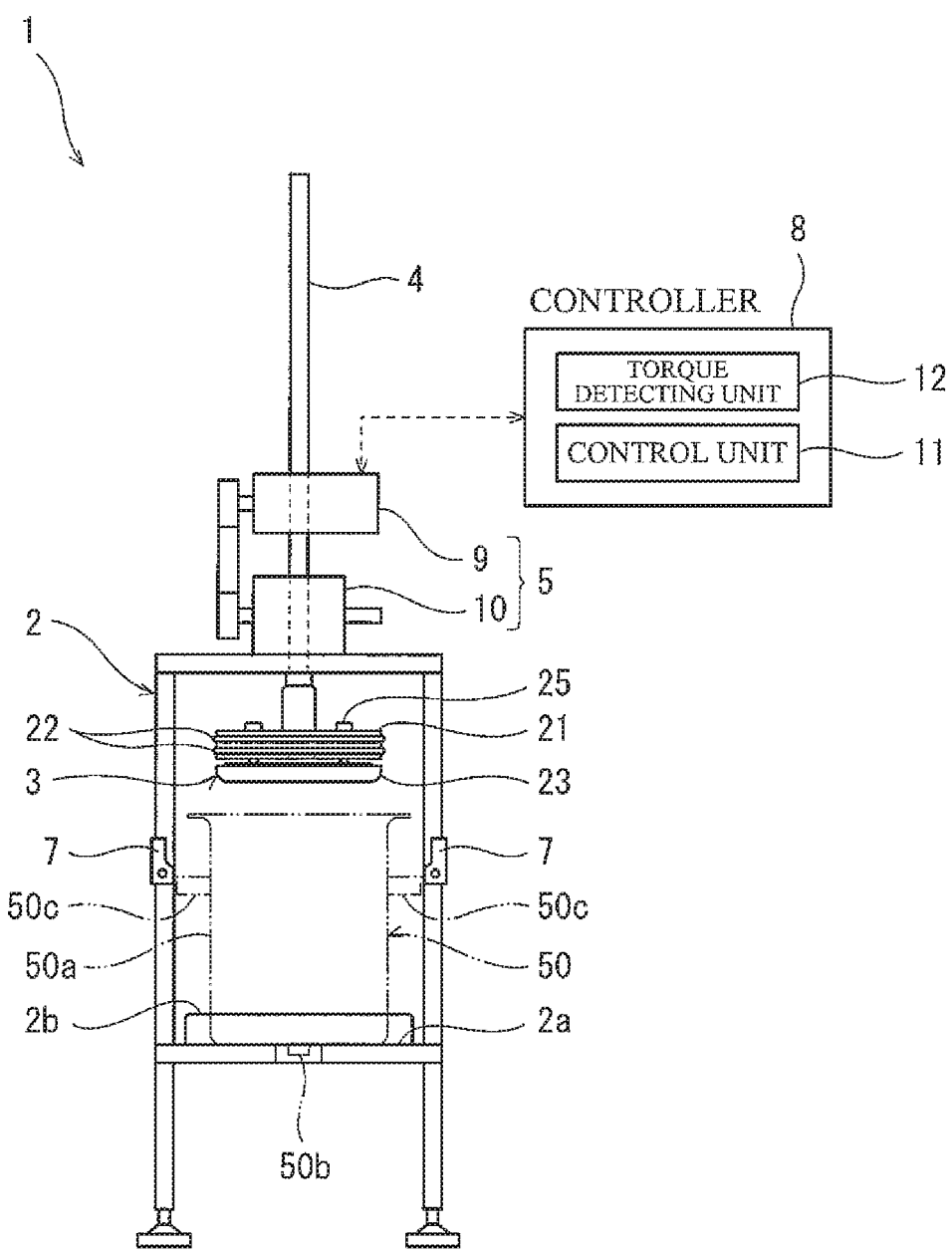
FIG. 1 is a front view of a push-out apparatus according to an embodiment.

FIG. 1 is a front view of a push-out apparatus 1 according to the embodiment. The push-out apparatus 1 is an apparatus configured to eject a non-Newtonian fluid to a workpiece (not shown) from a container 50 in which the fluid is stored. As shown in FIG. 1, the push-out apparatus 1 includes a frame 2, a piston 3, a rod 4, an actuator 5, clamps 7, and a controller 8.

The frame 2 includes a base portion 2a on which the container 50 is placed. The container 50 includes a container main body 50a, an ejection port 50b, and a pair of protruding portions 50c. The container main body 50a has a recessed cross section including an opening that is open upward. The ejection port 50b is provided at part of a bottom wall portion of the container main body 50a and is open downward. The protruding portions 50c project outward from a peripheral wall portion of the container main body 50a. An inner diameter of the container main body 50a is constant. A positioning portion 2b is provided at the base portion 2a. The positioning portion 2b positions a lower portion of the peripheral wall portion of the container 50 in a horizontal direction. The piston 3 is arranged so as to be able to advance toward and retreat from the fluid in the container 50, placed on the base portion 2a, in a vertical direction through the opening of the container 50. The rod 4 is fixed to the piston 3 so as to extend upward from the piston 3.

The actuator 5 is a linear actuator configured to make the piston 3 and the rod 4 reciprocate in the vertical direction. The actuator 5 is supported by the frame 2. The actuator 5 includes a servomotor 9 and a linear jack 10. The linear jack 10 converts rotational force of the servomotor 9 into linear force acting in the vertical direction. To be specific, the rotational force of the servomotor 9 is input to the linear jack 10, and with this, the linear jack 10 moves the rod 4 in the vertical direction.

The clamps 7 are provided at the frame 2 and are configured to be able to fix the container 50 in an advancing-retreating direction (i.e., the vertical direction) of the piston 3. Specifically, each of the clamps 7 is movable between a clamp position and a non-clamp position. When the clamps 7 are located at the clamp positions, the clamps 7 press, from above, the protruding portions 50c of the container 50 placed on the base portion 2a. When the clamps 7 are located at the non-clamp positions, the clamps 7 are retracted such that the container 50 placed on the base portion 2a can move upward. The clamps 7 can be locked at the clamp positions. The clamps 7 may be, for example, toggle clamps but is not limited to these.

When the clamps 7 are located at the clamp positions, the container 50 is sandwiched between the clamps 7 and the base portion 2a to be prevented from moving in the vertical direction. However, the container 50 is allowed to move in the horizontal direction within a predetermined movement range. To be specific, each of the clamps 7 is configured to include a surface opposed to the protruding portion 50c of the container 50 in the horizontal direction with a gap when the clamp 7 is located at the clamp position or is configured not to include a surface opposed to the protruding portion 50c of the container 50 in the horizontal direction when the clamp 7 is located at the clamp position.

The controller 8 is connected to the actuator 5. The controller 8 includes a control unit 11 and a torque detecting unit 12. The control unit 11 controls the position of the piston 3 in the vertical direction by supplying electric power to the servomotor 9 to operate the linear jack 10. The torque detecting unit 12 detects torque transmitted from the actuator 5 to the piston 3. Specifically, since a current value of the servomotor 9 is proportional to the torque, the torque detecting unit 12 recognizes the torque by detecting the current value of the servomotor 9. When the torque (current value) detected by the torque detecting unit 12 exceeds a predetermined upper limit, the control unit 11 reduces the driving force of the servomotor 9. The upper limit is determined so as to correspond to an allowable upper limit of pressure transmitted from the piston 3 through the fluid to the workpiece (not shown).

Figure 2:
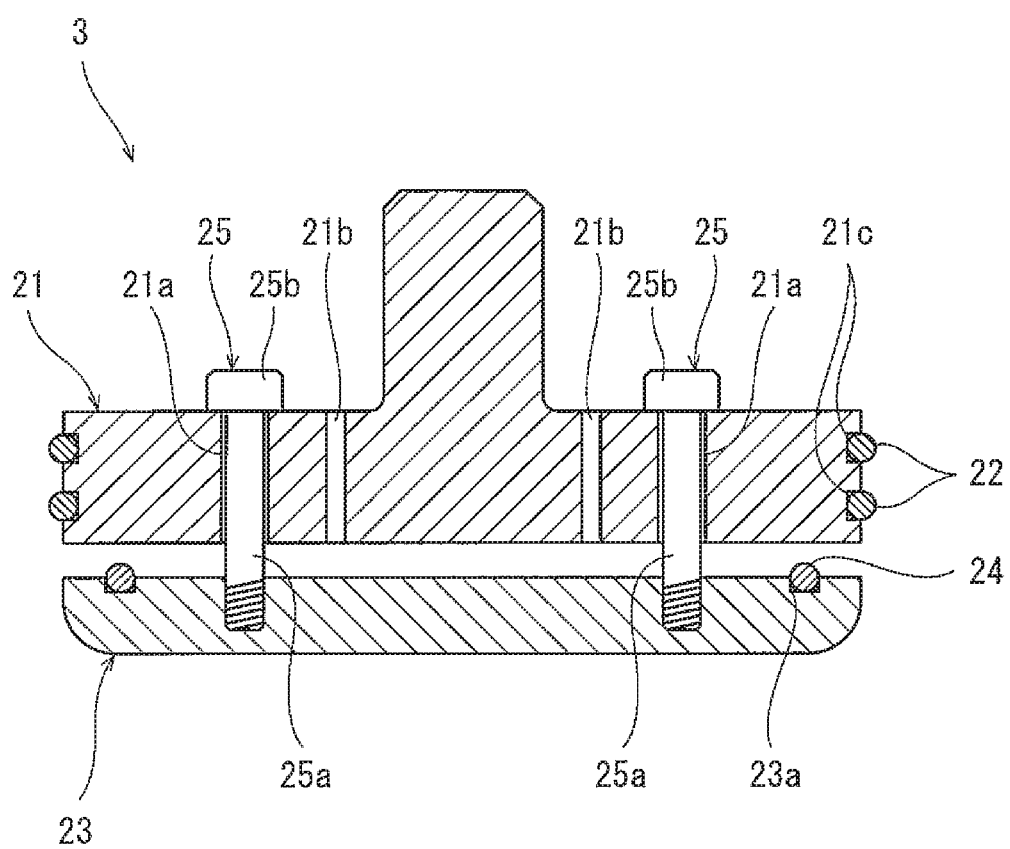
FIG. 2 is a vertical cross sectional view of a piston of the push-out apparatus shown in FIG. 1.

FIG. 2 is a vertical cross sectional view of the piston 3 of the push-out apparatus 1 shown in FIG. 1. As shown in FIG. 2, the piston 3 includes a base body 21, sealing rings 22, a pressing body 23, a sealing member 24, and supporting members 25. The base body 21 has a circular plate shape. The base body 21 is fixed to a lower end portion of the rod 4. The base body 21 includes guide holes 21a, air discharge holes 21b, and ring grooves 21c. The guide holes 21a are through holes extending in the vertical direction. The air discharge holes 21b are through holes extending in the vertical direction. The ring grooves 21c are formed on an outer peripheral surface of the base body 21. The guide holes 21a are arranged at a radially outer side of the air discharge holes 21b. The annular sealing rings 22 are fitted in the respective ring grooves 21c. The sealing rings 22 are made of an elastic material (for example, silicone or rubber). The sealing rings 22 project outward in a radial direction beyond the outer peripheral surface of the base body 21.

The pressing body 23 has a circular plate shape. The pressing body 23 is arranged under the base body 21. The pressing body 23 can approach and separate from the base body 21. The pressing body 23 is a no-hole member not including a through hole through which the fluid F can flow. An outer diameter of the pressing body 23 is smaller than an outer diameter of the sealing ring 22. To be specific, the outer diameter of the pressing body 23 is smaller than an inner diameter of the container 50. An outer peripheral edge of the pressing body 23 is located at a radially outer side of the guide holes 21a and the air discharge holes 21b. The outer diameter of the pressing body 23 is equal to or more than 90% of the inner diameter of the container 50. Especially, it is preferable that the outer diameter of the pressing body 23 be equal to or more than an outer diameter of a bottom surface of the ring groove 21c of the base body 21 (i.e., equal to or more than a minimum diameter of the ring groove 21c).

An outer peripheral edge of a lower surface (i.e., a surface opposed to the fluid) of the pressing body 23 is chamfered in a circular-arc shape. An annular groove 23a is formed on an upper surface (i.e., a surface opposed to the base body 21) of the pressing body 23. The annular sealing member 24 is fitted in the annular groove 23a of the pressing body 23. When viewed from the vertical direction, the sealing member 24 is arranged at such a position as to surround the guide holes 21a and air discharge holes 21b of the base body 21. The sealing member 24 is made of an elastic material (for example, silicone or rubber). The sealing member 24 projects upward (i.e., toward the base body 21) beyond the upper surface (i.e., a surface opposed to the base body 21) of the pressing body 23.

The supporting members 25 support the pressing body 23 in a state where the pressing body 23 separates downward from the base body 21. Each of the supporting members 25 includes a shaft portion 25a and a stopper portion 25b. The shaft portion 25a extends through the guide hole 21a of the base body 21 and is fixed to the pressing body 23. The stopper portion 25b is provided at an upper portion of the shaft portion 25a and contacts an upper surface of the base body 21 so as to be separable from the upper surface of the base body 21. It should be noted that the stopper portion 25b do not have to directly contact the upper surface of the base body 21 and may indirectly contact the upper surface of the base body 21 through another member. To be specific, the stopper portion 25b is only required to be configured to be unable to pass through the guide hole 21a of the base body 21. The shaft portion 25a extends through the guide hole 21a so as to be movable relative to the base body 21 in the vertical direction. It is preferable that a portion of an outer peripheral surface of the shaft portion 25a which portion is opposed to an inner peripheral surface of the guide hole 21a be a smooth surface on which threads are not formed.

External threads are formed on a lower end portion of the shaft portion 25a, and internal threads are formed at a portion of the pressing body 23 which portion corresponds to the shaft portion 25a. To be specific, the shaft portion 25a is fixed to the pressing body 23 by being threadedly engaged with the pressing body 23. The stopper portion 25b has such a shape and size as to be unable to pass through the guide hole 21a. To be specific, the stopper portion 25b is larger in diameter than the shaft portion 25a and the guide hole 21a. With this configuration, the supporting members 25 are movable relative to the base body 21 in the piston advancing-retreating direction within a range in which the stopper portions 25b and the sealing member 24 do not interfere with the base body 21.

When no external force acts on the pressing body 23, the pressing body 23 separates downward from the base body 21 by the own weights of the pressing body 23 and the supporting members 25, and the stopper portions 25b contact the upper surface of the base body 21. With this, the pressing body 23 is suspended from the base body 21 by the supporting members 25 in a state where the pressing body 23 and the sealing member 24 are spaced apart from the base body 21. To be specific, when the pressing body 23 is not receiving force from the fluid F in the container 50, the pressing body 23 is arranged at a first position at which the pressing body 23 separates from the base body 21 to open the air discharge holes 21b.

When the pressing body 23 is located at the first position, a clearance between the sealing member 24 and the base body 21 in the piston advancing-retreating direction is smaller than the thickness of the pressing body 23. When external force acts on the pressing body 23 in an upper direction, the shaft portion 25a is moved upward in the guide hole 21a, and with this, the pressing body 23 approaches the base body 21. To be specific, when the pressing body 23 receives the force from the fluid F in the container 50, the pressing body 23 approaches the base body 21 to bring the sealing member 24 into contact with the base body 21, and with this, the pressing body 23 is arranged at a second position at which the pressing body 23 closes the air discharge holes 21b.

Figure 3A:
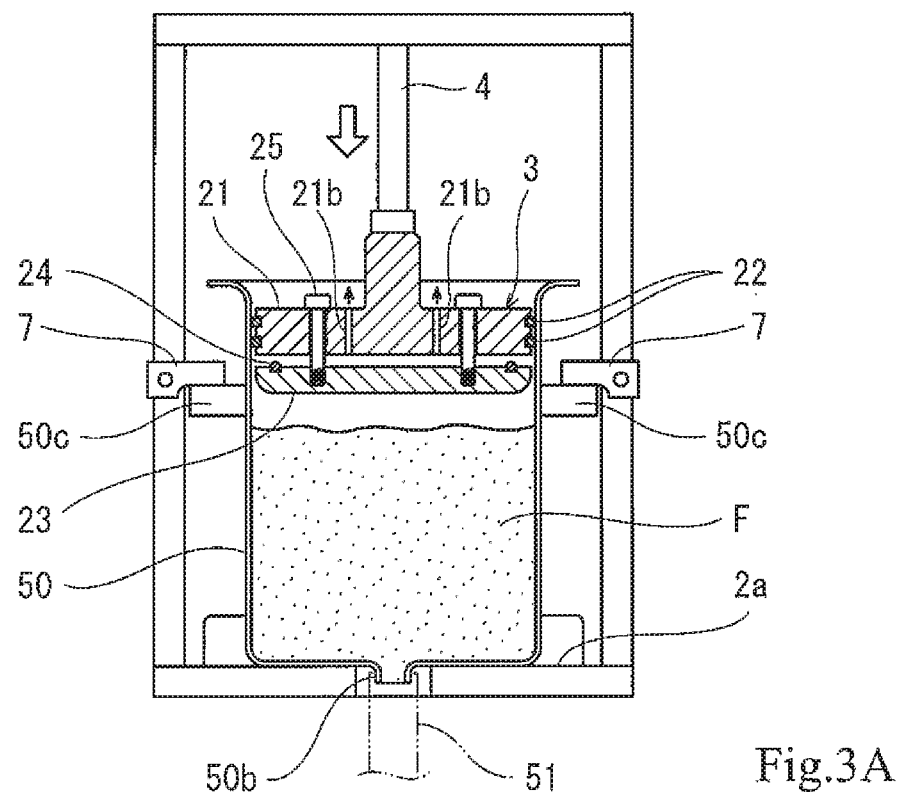
FIGS. 3A and 3B are diagrams for explaining operations of the push-out apparatus shown in FIG. 1.
Figure 3B:
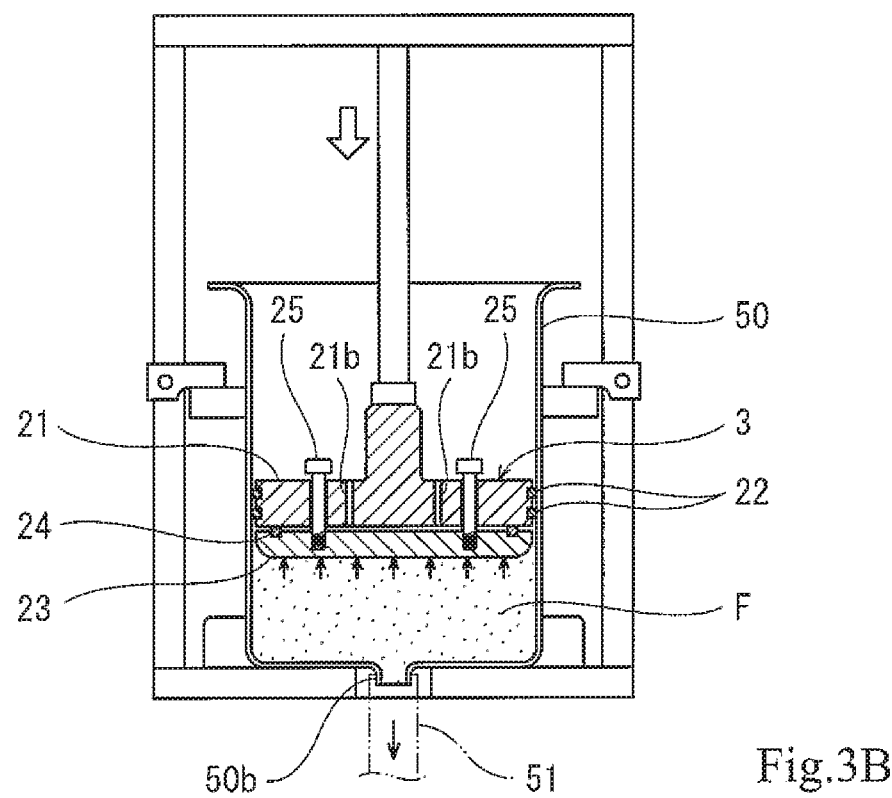

FIGS. 3A and 3B are diagrams for explaining operations of the push-out apparatus 1 shown in FIG. 1. In the present embodiment, the non-Newtonian fluid F stored in the container 50 is a Bingham fluid, and is, for example, a fluid having viscosity within a range of 1,300 to 3,500 poise. As one example, a highly viscous adhesive prepared by mixing a main agent and a curing agent is used as the fluid F. As shown in FIG. 3A, the container 50 in which the degassed fluid F is stored is placed on the base portion 2a, and the clamps 7 are locked while pressing the protruding portions 50c of the container 50 from above. A tube 51 is connected to the ejection port 50b of the container 50. Then, the actuator 5 moves the piston 3 downward based on a command from the controller 8 (see FIG. 1). With this, the piston 3 is inserted into the container 50 through the opening of the container 50.

The sealing rings 22 slidingly contact an inner peripheral surface of the container 50. Since the pressing body 23 is smaller in diameter than the sealing ring 22, the pressing body 23 is arranged in a non-hermetical state with respect to the container 50. To be specific, a gap is generated between the outer peripheral edge of the pressing body 23 and the inner peripheral surface of the container 50. An inside of the container 50 sealed by the sealing rings 22 communicates with an outside of the container 50 through the air discharge holes 21b. When the pressing body 23 is located away from the fluid F in the container 50, the pressing body 23 is suspended from the base body 21 by the supporting members 25, i.e., is arranged at the first position, and the sealing member 24 is separated from the base body 21. Therefore, the air discharge holes 21b of the base body 21 are open. On this account, as the piston 3 moves downward, the air existing between the piston 3 and the fluid F passes through the gap between the outer peripheral edge of the pressing body 23 and the inner peripheral surface of the container 50 to be discharged to the outside of the container 50 through the air discharge holes 21b.

As shown in FIG. 3B, when the piston 3 further moves downward, and the pressing body 23 starts pressing the fluid F in the container 50 downward, the pressing body 23 approaches the base body 21 by the force from the fluid F while moving the supporting members 25 upward relative to the base body 21. With this, the pressing body 23 moves to the second position at which the sealing member 24 contacts the base body 21, and thus, the air discharge holes 21b are closed. The piston 3 is configured such that before the fluid F in the container 50 reaches the upper surface (i.e., a surface located close to the base body 21) of the pressing body 23, the force applied from the fluid F to the pressing body 23 in the piston advancing-retreating direction exceeds force by which the pressing body 23 is kept at the first position, i.e., by the own weights of the pressing body 23 and the supporting members 25. It should be noted that if friction is generated between each shaft portion 25a and each guide hole 21a when each supporting member 25 is moved relative to the base body 21, the force by which the pressing body 23 is kept at the first position is a sum of the own weights of the pressing body 23 and the supporting members 25 and frictional force applied from the guide holes 21a to the shaft portions 25a.

When the fluid F is high in viscosity, the force acting on the pressing body 23 from the fluid F before the fluid F reaches the upper surface of the pressing body 23 may be mainly mechanical reaction force acting on the pressing body 23 from the fluid F. When the fluid F is low in viscosity, the force acting on the pressing body 23 from the fluid F before the fluid F reaches the upper surface of the pressing body 23 may be mainly buoyant force acting on the pressing body 23 from the fluid F. Then, when the piston 3 further moves downward, the fluid F is ejected from the ejection port 50b of the container 50 without flowing into the air discharge holes 21b.

According to the above described configuration, in a case where the pressing body 23 arranged non-hermetically with respect to the container 50 is located at the first position, the air existing between the fluid F in the container 50 and the piston 3 can be discharged to the outside of the container 50 through the air discharge holes 21b of the base body 21 even when the sealing rings 22 provided at the base body 21 are in slide contact with the inner peripheral surface of the container 50. Then, after the air is discharged, the pressing body 23 receives the force from the fluid F in the container 50, and with this, the pressing body 23 moves to the second position to close the air discharge holes 21b. Therefore, the fluid F can be ejected from the ejection port 50b of the container 50 while preventing the fluid F from flowing backward through the air discharge holes 21b.

By the own weights of the pressing body 23 and the supporting members 25, the stopper portions 25b contact the upper surface of the base body 21, and the pressing body 23 is suspended and supported. On the other hand, when the pressing body 23 receives the force from the fluid F in the container 50, the pressing body 23 approaches and moves toward the base body 21 together with the supporting members 25. Therefore, the pressing body 23 can be supported and allowed to move by such simple configuration.

Before the fluid F in the container 50 reaches the upper surface of the pressing body 23, the force applied from the fluid F to the pressing body 23 exceeds the force (i.e., the own weights) by which the pressing body 23 is kept at the first position. Therefore, the pressing body 23 moves to the second position before the fluid F reaches the upper surface of the pressing body 23. Thus, the fluid F can be prevented from flowing into the air discharge holes 21b when the piston 3 starts pressing the fluid F.

When no external force acts on the pressing body 23, the sealing member 24 opens the air discharge hole 21b. When the force from the fluid F acts on the pressing body 23, the sealing member 24 closes the air discharge holes 21b. Therefore, the fluid F can be prevented from flowing into the air discharge holes 21b while the fluid F is being ejected.

Since the outer diameter of the pressing body 23 is smaller than the outer diameter of the sealing ring 22, the air between the fluid F in the container 50 and the pressing body 23 can be discharged from the air discharge holes 21b through the gap between an outer peripheral surface of the pressing body 23 and the inner peripheral surface of the container 50. Since the gap is generated between the pressing body 23 and the container 50, the pressing body 23 can be prevented from approaching and moving toward the base body 21 by frictional resistance from the inner peripheral surface of the container 50 before the pressing body 23 in the container 50 reaches the fluid F.

The outer diameter of the pressing body 23 is equal to or more than 90% of the inner diameter of the container 50 and is specifically equal to or more than the outer diameter of the bottom surface of the ring groove 21c of the base body 21. Therefore, a contact area of the base body 21 with the fluid F is made small, and therefore, the base body 21 can be further easily washed. Since the gap between the container 50 and the pressing body 23 is small, the gap serves as a restrictor that generates resistance when the highly viscous fluid F flows through the gap. Since the pressing body 23 itself is the no-hole member through which the fluid F does not flow, the pressing body 23 can be easily washed.

The clamp 7 allows the container 50 to move within at least the predetermined movement range in a direction perpendicular to the advancing-retreating direction of the piston 3. Therefore, when the sealing rings 22 of the piston 3 slide on the inner peripheral surface of the container 50, the positional displacement between the container 50 and the piston 3 in the direction perpendicular to the advancing-retreating direction of the piston 3 can be self-corrected by the movement of the container 50.

When the torque of the actuator 5 exceeds the predetermined upper limit, the controller 8 reduces the driving force of the actuator 5. Therefore, it is possible to prevent a case where the pressure of the fluid F ejected from the ejection port 50b of the container 50 becomes excessive, and therefore, the load transmitted from the fluid F to the workpiece becomes excessive.

The present invention is not limited to the above embodiment, and modifications, additions, and eliminations may be made with respect to the configuration of the embodiment. For example, the sealing member 24 may be provided at the base body 21 instead of the pressing body 23 so as to be opposed to the pressing body 23. Instead of the sealing member 24, valves that can open and close the air discharge holes 21b may be provided, and the valves may open and close in conjunction with the movement of the pressing body 23 relative to the base body 21. Further, the sealing member 24 may not be provided, and the pressing body 23 itself may be configured to be able to close the air discharge holes 21b.

The pressing body 23 may be held at the first position by being biased by a spring in a direction away from the base body 21. In this case, the sum of the biasing force of the spring and the own weights of the pressing body 23 and the supporting members 24 may be set to be smaller than the force applied from the fluid F to the pressing body 23 before the fluid F reaches a surface of the pressing body 23 which surface is located close to the base body 21. Further, when the pressing body 23 is biased by the spring in the direction away from the base body 21, the advancing-retreating direction of the piston 3 is not especially limited and may be, for example, the horizontal direction. Each of the shape of the base body 21 and the shape of the pressing body 23 is not limited to the circular plate shape and may be, for example, a polygonal shape.

REFERENCE SIGNS LIST 1 push-out apparatus
3 piston
5 actuator
7 clamp
8 controller
11 control unit
12 torque detecting unit
21 base body
21a guide hole
21b air discharge hole
22 sealing ring
23 pressing body
24 sealing member
25 supporting member
25a shaft portion
25b stopper portion
50 container
50b ejection port
F fluid

The invention claimed is:

1. A push-out apparatus configured to eject a non-Newtonian fluid from an ejection port of a container in which the fluid is stored,
the push-out apparatus comprising a piston configured to advance toward and retreat from the fluid in the container through an opening of the container, the piston is configured to advance and retreat in an upper-lower direction,
the piston including:
a base body;
a sealing ring provided at an outer peripheral surface of the base body and configured to slidingly contact an inner peripheral surface of the container;
a pressing body provided at one side of the base body in a non-hermetical state with respect to the container and configured to press the fluid in the container, the one side being close to the fluid; and
a plurality of supporting members supporting the pressing body in a state where the pressing body is separated from the base body, and configured to advance and retreat in the upper-lower direction, wherein:
the base body includes an air discharge hole through which an inside and outside of the container communicate with each other, the inside and outside of the container being sealed by the sealing ring;
the pressing body approaches and separates from the base body between a first position at which the pressing body opens the air discharge hole and a second position at which the pressing body closes the air discharge hole; and
the pressing body is configured to separate from the base body by a weight of the pressing body and the supporting member, and supported by the supporting member at the first position and move to the second position by force applied from the fluid in the container.

2. The push-out apparatus according to claim 1, wherein:
the pressing body is arranged under the base body;
the base body includes a guide hole extending in the upper-lower direction;
the supporting member includes
a shaft portion extending through the guide hole and fixed to the pressing body and
a stopper portion provided at an upper portion of the shaft portion and configured to contact an upper surface of the base body so as to be separable from the upper surface of the base body; and
in a state where a gap is formed between the pressing body and the base body, the stopper portion contacts the upper surface of the base body, and the pressing body is therefore supported by the supporting member at the first position.

3. The push-out apparatus according to claim 1, wherein:
the piston further includes a sealing member provided at one of the base body and the pressing body so as to be opposed to the other of the base body and the pressing body;
when the pressing body is located at the first position, the sealing member separates from the other of the base body and the pressing body to open the air discharge hole; and
when the pressing body is located at the second position, the sealing member contacts the other of the base body and the pressing body to close the air discharge hole.

4. The push-out apparatus according to claim 1, wherein an outer diameter of the pressing body is smaller than an outer diameter of the sealing ring.

5. The push-out apparatus according to claim 1, wherein the piston is configured such that before the fluid reaches a surface of the pressing body which surface is located close to the base body, force applied to a surface of the pressing body which surface is located close to the fluid from the fluid exceeds force by which the pressing body is kept at the first position.

6. The push-out apparatus according to claim 1, further comprising a clamp configured to fix the container in an advancing-retreating direction of the piston, wherein
the clamp allows the container to move within at least a predetermined movement range in a direction perpendicular to the advancing-retreating direction.

7. The push-out apparatus according to claim 1, further comprising:
an actuator configured to operate the piston; and
a controller configured to control the actuator, wherein the controller includes:
a torque detecting unit configured to detect torque transmitted from the actuator to the piston; and
a control unit configured to reduce driving force of the actuator when the torque detected by the torque detecting unit exceeds a predetermined upper limit.

8. The push-out apparatus according to claim 1, wherein:
the base body includes a guide hole through which the supporting member extends, the guide hole extending in the upper-lower direction; and
the guide hole is arranged at a radially outer side of the air discharge hole.

* * * * *